UNITED STATES PATENT OFFICE.

LEWIS H. SPEAR, OF BRAINTREE, VERMONT.

IMPROVED MODE OF PRESERVING ANIMAL AND VEGETABLE SUBSTANCES.

Specification forming part of Letters Patent No. 42,025, dated March 22, 1864.

*To all whom it may concern:*

Be it known that I, LEWIS H. SPEAR, of Braintree, in the county of Orange and State of Vermont, have invented a new and useful Improvement in Preserving Vegetable and Animal Substances; and I do hereby declare that the following is a full and exact description thereof.

My invention consists in the use of sulphite of soda and other alkaline sulphites for preserving animal and vegetable substances.

After many years' experiment in the use of sulphite of soda in various ways, and in the use of sulphite of lime, of potash, and of other sulphites, and also of sulphurous acid in water, I prefer the following method: The sulphite of soda may be prepared in the usual way well known to chemists. Then make a solution of eight ounces of the crystals of sulphite of soda in a pint of water, thus forming my preserving-solution. But I prefer to make the sulphite of soda as follows: Dissolve two pounds of sal-soda (carbonate) in two quarts of water, making a saturated solution, and put the same into a revolving barrel having a hollow axle, (well known in manufactories.) Then slowly burn one pound of sulphur or brimstone in a furnace provided with a dome and pipe leading into the revolving barrel through the hollow axle. At the opposite end of the barrel an escape-tube must lead to a chimney in order to carry off the excess of air and fumes. Care should be taken not to choke the barrel and tubes with excess of fumes from the furnace by too rapid burning. The sulphurous acid has an affinity for the carbonate of soda, and by the agitation from revolving the barrel the acid and alkali readily combine, forming sulphite of soda in solution. The alkaline solution is thus neutralized, and the process should be continued until the slightest excess of acid is absorbed by the solution. This excess is determined by the use of Litmus paper, which on being dipped in the solution is turned from a blue to a pinkish color.

Vegetables of various descriptions and fruits, also animal substances—as meat, fowls, fish, oysters, jellies—may be prepared as if for boiling or stewing for the table, put into a proper vessel in the usual way, and then my above-described solution may be added, say, in the proportion of one ounce of the solution to eight pounds of fruit or four pounds of vegetables or one pound of animal substance. Then boil or steam until the solution permeates the mass.

Thus treated, substances may be put up in wooden casks or in glass or stone or other proper vessels and permanently preserved without sealing. It may be better to stopper the vessel, but I do not find that necessary.

Reheating or the addition of more of my preserving-solution is rarely, if ever, necessary.

Strawberries and other small fruits, currant jelly and similar sirups, also animal jellies, may be preserved in the same manner.

The substance to be preserved may be first cooked and then treated with my solution; or in many instances fruits and other substances can be preserved uncooked in the similar manner.

Baked meats may be preserved by my solution; but it is best to cut all meats thus preserved, so that the solution will completely permeate the entire mass; and usually it is best to cover the meat with its soup, juice, or suitable pickle.

Instead of using definite quantities of sal-soda and water, as mentioned above, it is more convenient to put any quantity of sal-soda and water into a vessel and stir the same three times in twelve hours, or leave it a longer time at rest until the water is saturated, and then put this solution into the revolving barrel, and then proceed as above described.

I am aware that sulphite of lime has been used for preventing fermentation of cane-juice, cider, and wine.

Having thus fully described my invention, what I claim, and desire to secure by Letters Patent of the United States, is—

The use of sulphite of soda or other alkaline sulphites for preserving vegetables, fruits, jellies, meats, oysters, or other fish, substantially as described.

LEWIS H. SPEAR.

Witnesses:
   G. BREED,
   DANIEL BREED.